F. D. NEWBURY.
DYNAMO ELECTRIC MACHINE.
APPLICATION FILED APR. 12, 1915.
1,320,789.
Patented Nov. 4, 1919.
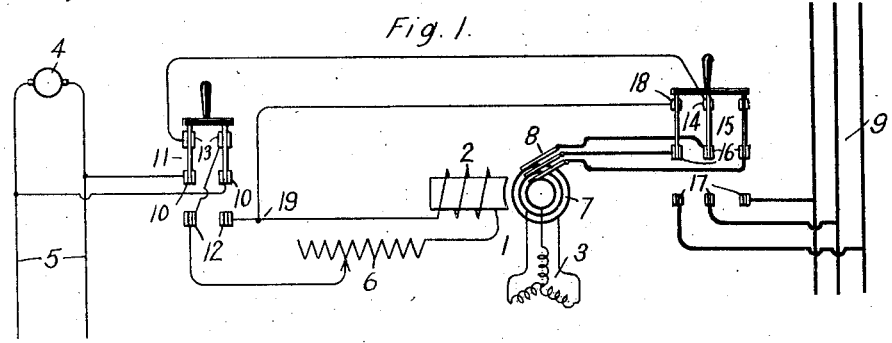
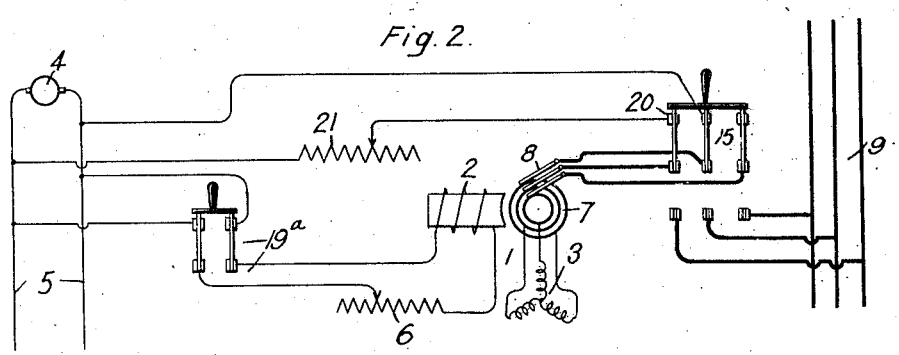
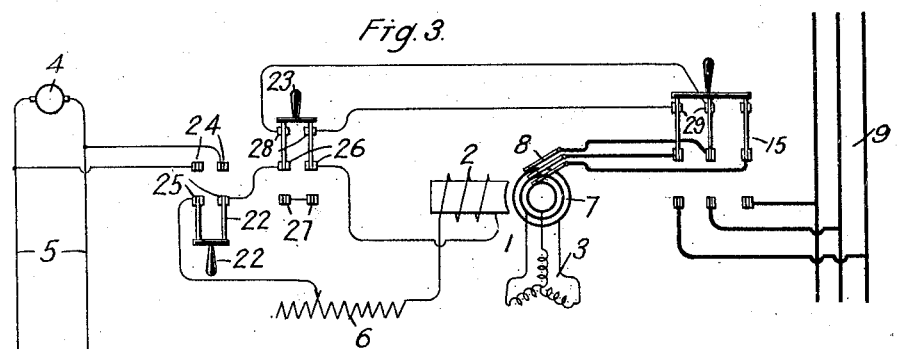
WITNESSES:
Fred H Miller
O. W. Kennedy
INVENTOR
Frank D. Newbury
BY
Wesley G. Carr
ATTORNEY

UNITED STATES PATENT OFFICE.

FRANK D. NEWBURY, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,320,789.   Specification of Letters Patent.   Patented Nov. 4, 1919.

Application filed April 12, 1915. Serial No. 20,685.

*To all whom it may concern:*

Be it known that I, FRANK D. NEWBURY, a citizen of the United States, and a resident of Pittsburgh, in the county of Allegheny and State of Pennsylvania, have invented a new and useful Improvement in Dynamo-Electric Machines, of which the following is a specification.

My invention relates to electric brakes for dynamo-electric machines, and it has particular reference to method of braking alternating-current generators of the water-wheel type.

The object of my invention is to provide an effective method of electrical braking that may be readily applied with simple circuit connections to machines of the above-indicated type.

In the operation of water-wheel generators, particularly those of the vertical type, the usual form of wheel-gate mechanism does not permit entirely shutting off the water supply, with the result that, unless the head-gates are closed, the turbine wheels and generators will continue to rotate even when the wheel-gates are closed. With generators of large capacity, it has been the usual practice to install some form of mechanical brake, usually consisting of a suitable brake ring cast integrally with, or bolted to, the generator spider and adapted to be engaged by pneumatically operated brake shoes. Such a form of mechanical brake is expensive and, in certain types of hydraulic installation, is extremely inconvenient to install. By my invention, I propose to provide electrical means for accomplishing the same result.

It is well known, that, if the whole, or a part, of the armature winding of an alternating-current generator is energized by direct current, definite stationary magnetic poles are established. Furthermore, if, at the same time, the field-magnet winding is energized, the magnetic poles established by the latter winding will be attracted by the stationary poles of opposite polarity that are established by current traversing the armature winding. When the above-described condition exists, the relatively rotatable members of the machine will tend to lock together, and sufficient torque will be developed to overcome the torque developed by the leakage water impelling the turbine wheels, with relatively small currents traversing the armature and field magnet windings. While the force of the leakage water is often sufficient to keep the rotatable members in motion, it is not sufficient to overcome the inertia of the rotating parts when the machine is at rest. Therefore, after the machine has been brought to rest by the application of the electric brake, the field-magnet and armature circuits may be opened.

In the accompanying drawings, Figures 1, 2 and 3 are diagrammatic views of several switching arrangements whereby the above-described method of braking may be accomplished.

An alternating-current generator 1 comprises a stationary field-magnet winding 2, and a rotatable armature winding 3. The field-magnet winding 2 is adapted to receive excitation from a source of direct current 4 connected to bus bars 5 and is provided with a suitable regulating resistor 6 in circuit therewith. The armature winding 3 is adapted to be connected, through slip rings 7 and current collectors 8, to a feeder circuit 9.

Referring now to Fig. 1, the movable contact members 10 of a double-pole, double-throw switch 11 are connected to the direct-current bus bars 5. The lower pair of stationary contact members 12 are connected to the terminals of the circuit of the field magnet winding 2, and the upper stationary contact members 13 are connected, respectively, to the upper middle stationary contact member 14 of a three-pole, double-throw switch 15 and to the lower left hand stationary contact member 12 of the switch 11. The movable contact members 16 of the switch 15 are connected to the current collectors 8, and the lower stationary contact members 17 are connected to the feeder circuit 9. The upper left hand stationary contact member 18 of the switch 15 is connected to the field-magnet circuit at the point 19 intermediate the field-magnet winding 2 and the right hand contact member 12.

During the normal operation of the generator 1, the movable members 10 and 16 of the switches 11 and 15, respectively, are thrown to the lower sets of contact members 12 and 17, thereby connecting the field-magnet winding 2 to the bus bars 5, and the armature winding 3 to the feeder circuit 9. When it is desirable to bring the machine to rest, after the wheel-gates have been closed, the movable members 10 and 16 are thrown to their upper positions, as shown in the drawing, thereby connecting two phases of the three-phase armature winding 3 in series-circuit relation with the field-magnet winding 2 across the direct-current bus bars 5. While a three-phase winding is shown, the method is equally applicable to any number of phases.

Referring now to Fig. 2, the field-magnet winding 2 is connected to the direct-current bus bars 5 through a double pole, single-throw switch 19$^a$, and the upper left hand and middle stationary contact members 20 of the three-pole, double-throw switch 15 are connected to the direct-current bus bars 5 in circuit with a suitable variable resistor 21. The other connections of the switch 15 are the same as described with reference to Fig. 1. With this arrangement, the switch 19$^a$ remains closed during both the normal operation of the generator and during the braking period. The switch 15, however, is thrown to its lower position during the normal operation of the generator and is thrown to its upper position whenever it is desirable to bring the machine to rest. The variable resistor 21 serves to limit the amount of current traversing the armature winding 3 during the braking period.

Referring now to Fig. 3, the connections of the movable and lower stationary contact members of the three-pole, double-throw switch 15 are the same as described with reference to Figs. 1 and 2. The circuit of the field-magnet winding 2, however, is provided with a double-pole, single-throw switch 22, and a double-pole, double-throw switch 23. The stationary contact members 24 of the switch 22 are connected to the direct-current bus bars 5, and the movable contact members 25 are connected, respectively, to the left hand terminal of the field-magnet winding 2 and to the left hand movable contact member 26 of the switch 23. The other movable contact member 26 is connected to the right hand terminal of the field magnet winding. The lower stationary contact members 27 are connected together, and the upper stationary contact members 28 are connected to the upper left-hand and middle stationary contact members 29 of the switch 15. During normal operation of the machine, the switch 22 is closed and the switch 23 is thrown to its lower position, thereby connecting the field-magnet winding 2 to the direct-current bus bars 5. The switch 15 is also in its lower position. When it is desired to brake the machine, the switches 23 and 15 are thrown to their upper positions, thereby connecting the armature winding 3 in series-circuit relation with the field-magnet winding 2 across the direct-current bus bars 5.

With the above-described arrangements, it will be readily seen that the machine may be brought to rest by a simple manipulation of the switching devices. The braking effect can be obtained with a relatively small current traversing the armature and field-magnet windings because the said windings are in series-circuit relation, as shown in Figs. 1 and 3 or because the amount of current is limited by the variable resistor in the armature circuit, as shown in Fig. 2.

While I have shown my invention in a simple and preferred form and as applied to machines of the stationary field-magnet type, it will be understood that it may be as readily applied to machines having a stationary armature and I desire that only such limitations shall be imposed thereon as come within the scope of the appended claims.

I claim as my invention:

1. In an electric system, the combination with a synchronous alternating-current generator embodying an armature winding and a field winding, a source of direct current, and means for simultaneously connecting each of said windings to said source in order to bring said generator to rest.

2. In an electric system, the combination with a synchronous alternating-current generator embodying an armature winding and a field winding, a source of direct current, an external circuit, means for normally connecting said armature winding to said circuit and for connecting said field winding to said source of direct current, and alternative means for connecting said armature winding to said source of direct current when it is desired to brake said generator.

3. In an electric system, the combination with a synchronous alternating-current generator embodying an armature winding and a field winding, a source of direct current, and means for connecting said windings to said source of direct current in series relation when it is desired to brake said generator.

4. In an electric circuit, the combination with an alternating-current generator having a field magnet winding and an armature winding, of a source of direct current, an external circuit, means for energizing said field winding from said source of direct current, means for connecting said armature winding to said circuit, and alternative means for connecting the said armature winding in series-circuit relation with the said field-magnet winding across the said source of direct current.

5. In an electric circuit, the combination with an alternating-current generator having a field-magnet winding and an armature winding, of a source of direct current normally connected to said field winding, an external circuit normally connected to said armature winding, and alternative means for connecting a portion of said armature winding in series-circuit relation with the said field-magnet winding across the said source of direct current.

In testimony whereof, I have hereunto subscribed my name this 31st day of March, 1915.

FRANK D. NEWBURY.

Copies of this patent may be obtained for five cents each, by addressing the "Commissioner of Patents, Washington, D. C."